US012104429B2

(12) United States Patent
Paulus van den EINDEN

(10) Patent No.: US 12,104,429 B2
(45) Date of Patent: Oct. 1, 2024

(54) DOOR FRAME COMPRISING A FRAME AND A WALL CLAMP ATTACHED THERETO

(71) Applicant: Johannes Paulus van den EINDEN, Wanssum (NL)

(72) Inventor: Johannes Paulus van den EINDEN, Wanssum (NL)

( * ) Notice: Subject to any disclaimer, the term of this patent is extended or adjusted under 35 U.S.C. 154(b) by 247 days.

(21) Appl. No.: 17/657,131

(22) Filed: Mar. 30, 2022

(65) Prior Publication Data

US 2022/0316263 A1     Oct. 6, 2022

(30) Foreign Application Priority Data

Mar. 30, 2021    (NL) .................................... 2027870

(51) Int. Cl.
| | | |
|---|---|---|
| *E06B 1/60* | (2006.01) | |
| *E06B 1/52* | (2006.01) | |
| *E06B 1/56* | (2006.01) | |
| *E06B 1/62* | (2006.01) | |
| *E06B 3/04* | (2006.01) | |
| *F16B 2/06* | (2006.01) | |

(52) U.S. Cl.
CPC .............. *E06B 1/6061* (2013.01); *E06B 1/52* (2013.01); *E06B 1/56* (2013.01); *E06B 1/6046* (2013.01); *E06B 1/62* (2013.01); *E06B 3/04* (2013.01); *F16B 2/06* (2013.01); *E06B 2001/622* (2013.01)

(58) Field of Classification Search
CPC . E06B 1/52; E06B 1/56; E06B 1/6046; E06B 1/6061; E06B 1/62; E06B 2001/622
See application file for complete search history.

(56) References Cited

U.S. PATENT DOCUMENTS

| | | | | |
|---|---|---|---|---|
| 3,044,130 A | * | 7/1962 | Mehalfy .................. | E06B 1/18 49/67 |
| 3,545,135 A | * | 12/1970 | Lieber ..................... | E06B 1/30 49/505 |
| 3,585,770 A | * | 6/1971 | Maizler .................. | E06B 1/6061 403/231 |
| 3,609,928 A | * | 10/1971 | Mock ...................... | E06B 1/30 52/214 |

(Continued)

FOREIGN PATENT DOCUMENTS

| | | | | | |
|---|---|---|---|---|---|
| EP | | 303334 A | * | 2/1989 | ........... E05D 5/0238 |
| EP | | 0918127 A1 | * | 5/1999 | |

OTHER PUBLICATIONS

ISR; Netherlands Patent Office; Sep. 2, 2021.

*Primary Examiner* — Jessie T Fonseca
(74) *Attorney, Agent, or Firm* — Patshegen IP; Moshe Pinchas

(57) ABSTRACT

A door frame 1 has a frame post 3 which is secured with a rear side 5 against a reveal 7 of a wall opening 9 by means of a number of wall clamps 13. Each wall clamp 13 has two clamping parts 15, 17, each consisting of a fastening part 19, 21 and a clamping jaw 23, 25. At the rear 5, the frame post 3 is provided with a groove 27 which extends over the entire length of the frame post 3 and is present at an angle 29 of 10-50 degrees to the rear side. The fastening part 21 of the clamping part 17 partly protrudes into the groove 27 and is displaceable in and out of the groove 27 by turning screws 31 more or less in the door frame 3, which screws protrude through holes 35 present in the clamping jaw 25.

2 Claims, 3 Drawing Sheets

(56) References Cited

U.S. PATENT DOCUMENTS

| | | | | |
|---|---|---|---|---|
| 3,641,722 A | | 2/1972 | Schmitt | |
| 3,757,473 A | * | 9/1973 | Mundy | E06B 1/10 |
| | | | | 49/505 |
| 4,014,146 A | | 3/1977 | DiMascio | |
| 4,223,494 A | * | 9/1980 | Wendt | E06B 1/32 |
| | | | | 49/504 |
| 5,241,790 A | * | 9/1993 | Schimpf | E05C 21/00 |
| | | | | 49/504 |
| 5,412,909 A | * | 5/1995 | Wu | E06B 1/347 |
| | | | | 49/505 |
| 7,921,603 B2 | * | 4/2011 | Darnell | E06B 1/32 |
| | | | | 49/504 |
| 2010/0212239 A1 | * | 8/2010 | Wang | E06B 1/30 |
| | | | | 52/217 |

* cited by examiner

DOOR FRAME COMPRISING A FRAME AND A WALL CLAMP ATTACHED THERETO

TECHNICAL FIELD OF THE INVENTION

The invention relates to a door frame comprising:
a frame post which is provided with a rear with which the frame post is fixed during use against a reveal of a wall opening in a wall, and
a wall clamp, which is attached to the frame post, for fixing the frame post against the reveal of the wall opening, which wall clamp has two clamping parts, each of which comprises:
   a fastening part, with which the clamping part is fastened to the frame post, and
   a clamping jaw, which projects backwards at the rear of the frame,
of which clamping parts a first clamping part is present near a first longitudinal edge of the rear of the frame post and the other, second clamping part is present near a second longitudinal edge at the rear and is movably connected to the frame post in such a way that the clamping jaws can be moved towards and away from each other.

BACKGROUND OF THE INVENTION

A door frame in which the wall clamp is a fixed part on the frame that has already been mounted in a preparatory factory is generally known. This known door frame is not flexible in terms of wall thickness and usability.

SUMMARY OF THE INVENTION

An object of the invention is to provide a door frame provided with a wall clamp of the type described in the preamble, which can be used universally and flexibly. To this end, the door frame according to the invention is characterized in that:
   the rear of the frame post is provided with a groove that extends over the entire length of the frame post and is present at an angle of 10-50 degrees to the rear, wherein the groove extends in the frame post from the rear in the direction of the first longitudinal edge, and
   the fastening part of the second clamping part partly protrudes into the groove and is displaceable in and out of the groove by displacing means which are part of the wall clamp.

The groove is preferably formed by a saw cut in the rear side of the frame made of wood. The door frame according to the invention provided with wall clamps is moreover cheaper than the known door frame without compromising its reliability.

An embodiment of the door frame according to the invention is characterized in that the displacing means comprise at least one screw which projects through a hole present in the clamping jaw of the second clamping part, which hole is present in the second clamping part close to the fastening part, which screw is provided with a screw head which is present behind the edge of the hole and which screw protrudes at the same side of the clamping jaw as the fixing part. The screw finds its way into the solid wood through the play in the groove and guide along the inside of the second clamping part.

BRIEF DESCRIPTION OF THE DRAWINGS

The invention will be further elucidated below on the basis of drawings. These drawings show an embodiment of a door frame according to the present invention. In the drawings.

DETAILED DESCRIPTION OF THE DRAWINGS

Figure 1:
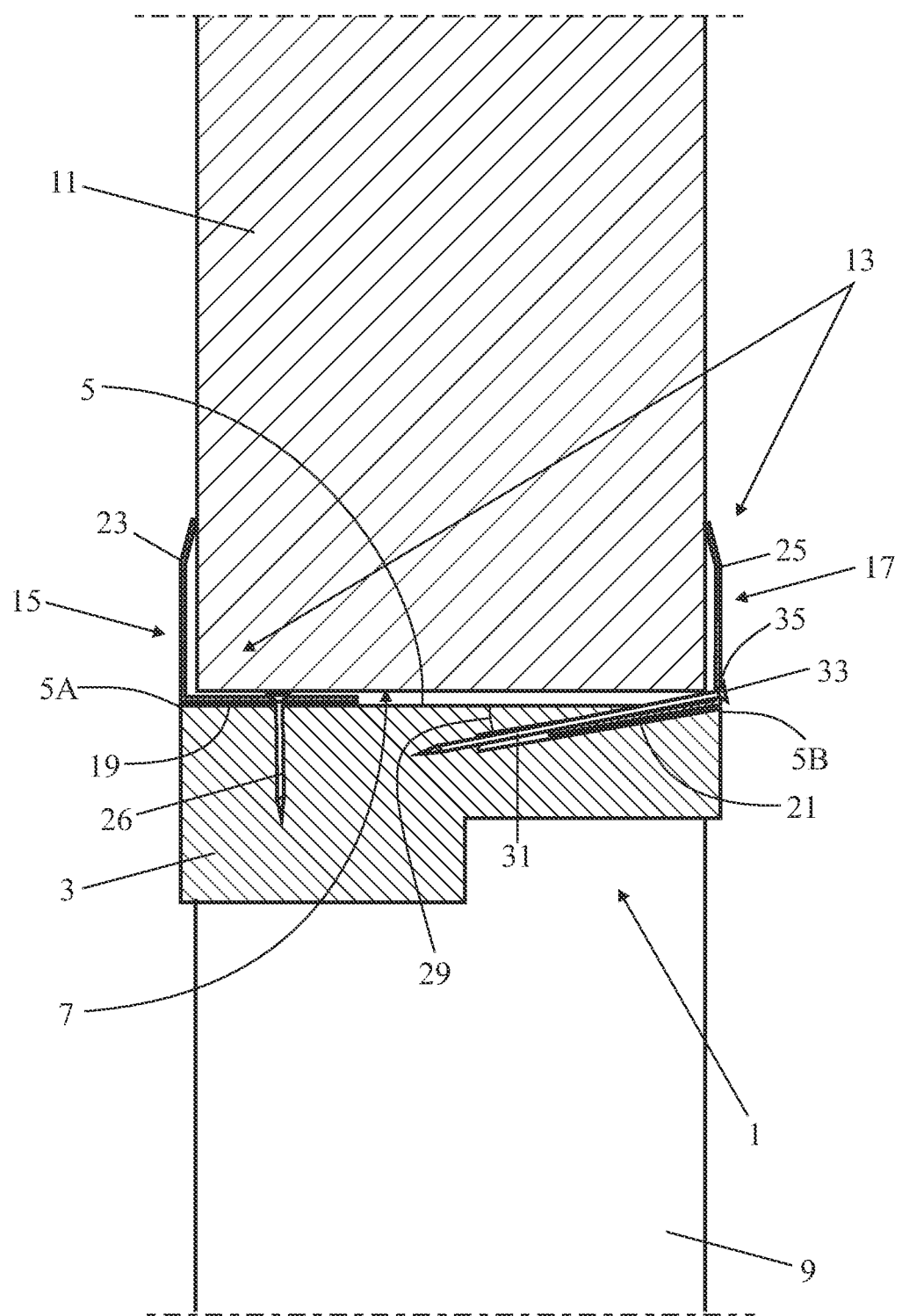
FIG. 1 is a horizontal section of a wall at the location of a wall opening with a first embodiment of the door frame according to the invention fixed against the reveal.

In FIG. 1 a wall 11 is shown in horizontal section at the location of a wall opening 9 with a first embodiment of the door frame 1 according to the invention fixed against the reveal 7. The door frame 1 has a frame post 3 which is provided with a rear side 5 which is mounted against the reveal 7 of the wall opening 9 and a number of wall clamps 13 (see also FIG. 2), which are attached to the frame post 3. There is space between the rear of the frame post 3 and the reveal 7 of the wall opening 9 for adjusting the frame post 3. The frame post 3 is secured by means of the wall clamps 13 on the flat sides of the wall along the edge of the reveal 7 of the wall opening 9.

Each wall clamp 13 has two clamping parts 15 and 17, which each consist of a fastening part 19 and 21 for fastening the clamping parts 15 and 17 to the frame post 3. The two clamping parts 15 and 17 further include a clamping jaw 23 and 25 which are substantially perpendicular to the respective fastening part 19 and 21 forming together an elongate profile with a substantially L-shaped cross-section. The clamping part 15 is present near a first longitudinal edge 5A of the rear 5 and is screwed with the fastening part 19 against the rear 5 of the frame post 3 by means of fixing screws 26. The clamping jaw 23 is perpendicular or virtually perpendicular to the rear side 5 of the frame post 3 and sticks back.

At the rear 5, the frame post 3 is provided with a groove 27 which extends over the entire length of the frame post 3 and is present at an angle 29 of 10-50 degrees to the rear side. This groove 27 extends from the rear side 5 in the direction of the first longitudinal edge 5A in the frame post 3. The clamping part 17 is present near a second longitudinal edge 5B of the rear side. The fixing part 21 of this clamping part 17 partly projects into the groove 27 and can be moved in and out of the groove 27 by displacing means. These displacing means are formed by screws 31 which protrude through holes 35 present in the clamping jaw 25 of the second clamping part 17. These holes 35 are present near the fastening part 21 in the second clamping part 17. The screws 31 are present with screw heads 33 behind the edges of the holes 35 and protrude on the same side of the clamping jaw 25 as the fastening part 21. By turning the screws 31 more or less in the door frame 3, the clamping jaws 23 and 25 are moved towards and away from each other.

Figure 2:
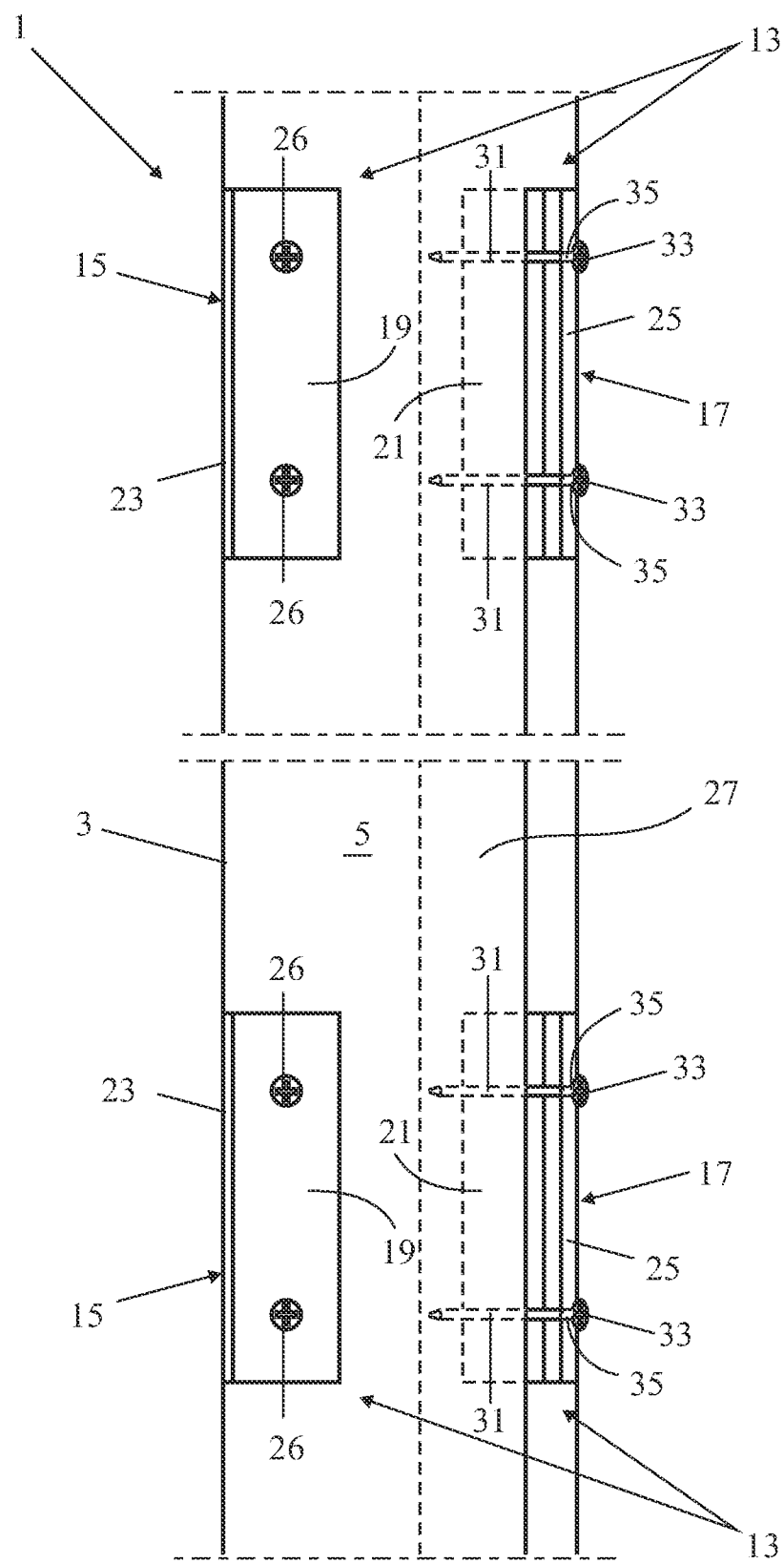
FIG. 2 is the door frame shown in FIG. 1 separately when viewed from the rear.

For clarification, in FIG. 2 the door frame is shown separately as seen on the back. It is necessary here that the door frame 1 is provided with two (or more) wall clamps 13 at a distance from each other.

Figure 3:
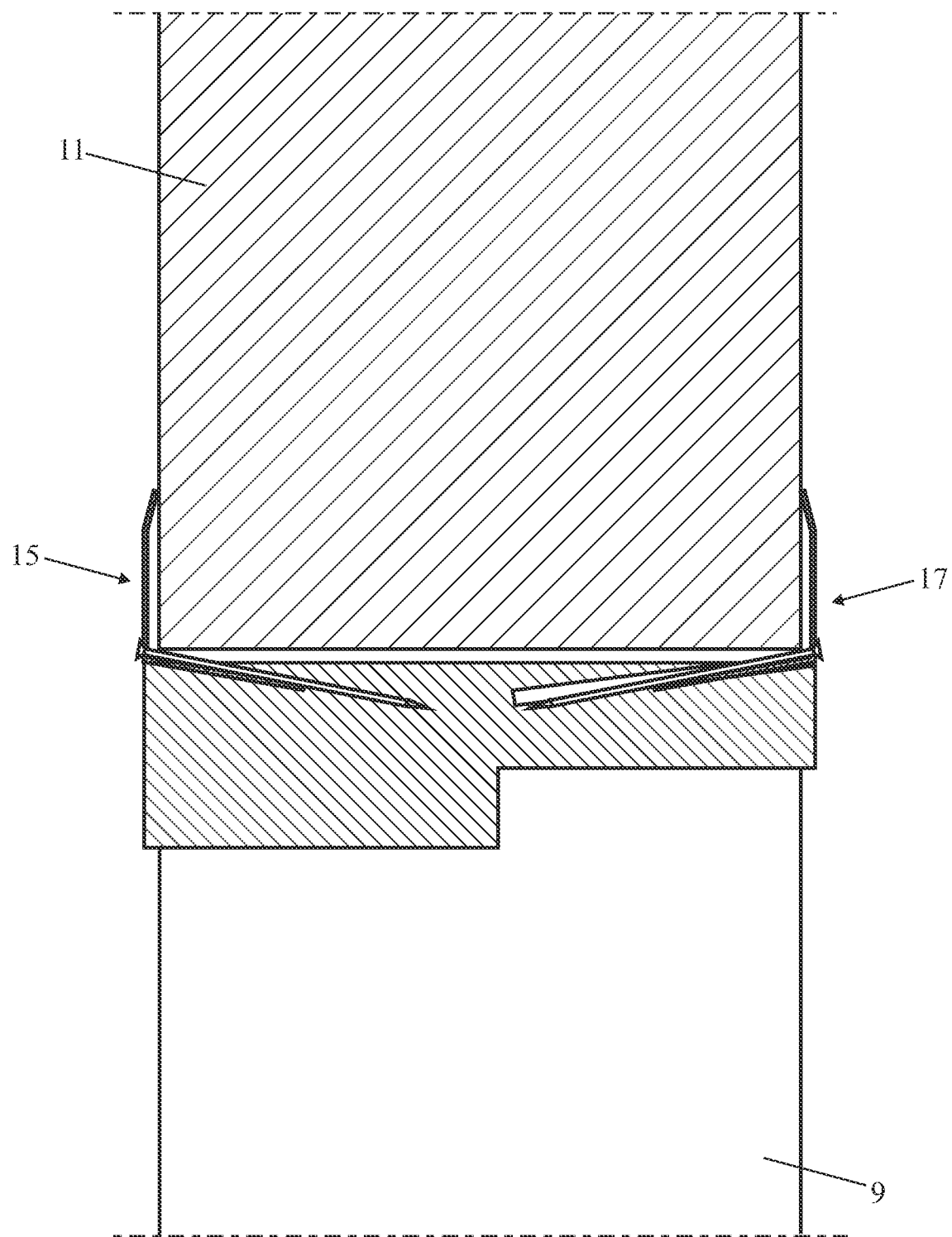
FIG. 3 is a horizontal section of a wall at the location of a wall opening with a second embodiment of the door frame according to the invention.

FIG. 3 shows a second embodiment of the door frame according to the invention present in a wall opening. In this case, the frame post is provided with two saw cuts and the two clamping parts 15 and 17 of the wall clamp are of identical design.

Although the present invention is elucidated above on the basis of the given drawings, it should be noted that this invention is not limited whatsoever to the embodiments shown in the drawings. The invention also extends to all embodiments deviating from the embodiments shown in the drawings within the scope of the invention defined by the appended claims.

The invention claimed is:

1. Door frame comprising:
    a frame post which is provided with a rear with which the frame post is fixed during use against a reveal of a wall opening in a wall, and
    a wall clamp, which is attached to the frame post, for fixing the frame post against the reveal of the wall opening, which the wall clamp has two clamping parts, each of which comprises:
        a fastening portion, including a first screw for securing said fastening portion to the frame post, and
        a clamping jaw, which projects backwards at the rear of the frame post,
    of which the two clamping parts a first clamping part is present near a first longitudinal edge of the rear of the frame post and the other, second clamping part is present near a second longitudinal edge at the rear and is movably connected to the frame post in such a way that the clamping jaws can be moved towards and away from each other,
    wherein:
        the rear of the frame post is provided with a groove that extends over the entire length of the frame post and is present at an angle of 10-50 degrees to the rear, wherein the groove extends in the frame post from the first longitudinal edge of the rear in the direction of an opposite side, and
        the fastening portion of the second clamping part is coupled to the clamping jaw of the second clamping part at an angle such that said fastening portion partly protrudes into the groove and is displaceable in and out of the groove by displacing means which are part of the wall clamp.

2. The door frame according to claim 1, wherein the displacing means comprise at least one screw which projects through a hole present in the clamping jaw of the second clamping part, which the hole is present in the second clamping part close to the fastening portion of the second clamping part, which the at least one screw is provided with a screw head which is present behind the edge of the hole and which the at least one screw protrudes at the same side of the clamping jaw of the second clamping part as the fastening part of the second clamping part.

* * * * *